United States Patent [19]

Honna et al.

[11] Patent Number: 5,391,278

[45] Date of Patent: Feb. 21, 1995

[54] PROCESS FOR REMOVAL OF HYDROGEN SULFIDE

[75] Inventors: Kosaku Honna; Hiroshi Noguchi; Hiroshi Iida; Masayuki Goto, all of Sodegaura, Japan

[73] Assignees: Idemitsu Kosan Co., Ltd.; Petroleum Energy Center, both of Tokyo, Japan

[21] Appl. No.: 184,679

[22] Filed: Jan. 21, 1994

[30] Foreign Application Priority Data

Feb. 25, 1993 [JP] Japan .................................. 5-036653
Aug. 24, 1993 [JP] Japan .................................. 5-209153

[51] Int. Cl.$^6$ ........................ C01B 17/05; C01B 17/02
[52] U.S. Cl. .................................. 204/129; 204/130; 204/151; 423/576.4; 423/576.5; 423/576.6
[58] Field of Search ............... 204/104, 129, 130, 151; 423/576.2, 576.4, 576.5, 576.6

[56] References Cited

U.S. PATENT DOCUMENTS 4,937,057  6/1990  Taionen et al. ...................... 423/220

FOREIGN PATENT DOCUMENTS 634881  11/1991  Australia .
0158748  10/1985  European Pat. Off. .
0348875  1/1990  European Pat. Off. .
0455285  11/1991  European Pat. Off. .
0464532  1/1992  European Pat. Off. ......... 423/576.5
3523073  1/1986  Germany .
4-362008  12/1992  Japan .

*Primary Examiner*—John Niebling
*Assistant Examiner*—Arun S. Phasge
*Attorney, Agent, or Firm*—Frishauf, Holtz, Goodman & Woodward

[57] ABSTRACT

A process for removal of hydrogen sulfide is here provided by which sulfur and hydrogen can be efficiently recovered from a hydrogen sulfide-containing gas and secondarily produced sulfuric acid can be properly treated, whereby a long-term continuous operation is possible in a closed system.

The invention is mainly directed to a process which comprises the steps of bringing a hydrogen sulfide-containing gas into contact with an aqueous iron salt ($Fe^{3+}$) solution to carry out oxidation reaction and to thereby produce a solution containing $Fe^{2+}$, sulfur and secondarily produced sulfuric acid in a hydrogen sulfide gas absorption-oxidation step, separating sulfur from the solution, electrochemically treating the solution to regenerate the aqueous iron salt ($Fe^{3+}$) solution, bringing a part of the solution from which sulfur has been separated into contact with hydrogen to reduce secondarily produced sulfuric acid contained in the solution and to thereby produce hydrogen sulfide, and then returning the thus produced hydrogen sulfide to the hydrogen sulfide gas absorption-oxidation step.

22 Claims, 2 Drawing Sheets

PROCESS FOR REMOVAL OF HYDROGEN SULFIDE

BACKGROUND OF THE INVENTION (1) Field of the Invention

The present invention relates to the improvement of a process for removal of hydrogen sulfide. More specifically, it relates to a process for removal of hydrogen sulfide which comprises a combination of an aqueous iron salt solution treatment and an electrochemical regeneration to recover sulfur and a hydrogen gas from a hydrogen sulfide-containing gas and which can inhibit the generation of industrial wastes (e.g., a waste iron solution, waste acids and waste iron salts), permits a long-term continuous operation in a closed system, and can efficiently recover sulfur and hydrogen.

(2) Description of the Related Art

Heretofore, hydrogen sulfide discharged in the refining of petroleum has been industrially treated by a Claus method. However, according to this method, a sulfur component in hydrogen sulfide can be recovered as sulfur, but a hydrogen component is converted into water without being recovered, and so the industrially efficient utilization of a hydrogen component cannot be realized.

Recently, as process for recovering sulfur and the hydrogen gas from hydrogen sulfide by means of oxidation and an electrochemical treatment, there are known methods in which an aqueous iron salt solution containing ferric ions is used. In such methods, various kinds of aqueous iron salt solutions containing the ferric ions are used, but in any process, the secondary production of a trace amount of sulfuric acid cannot be avoided. In consequence, sulfuric acid is accumulated in the aqueous iron salt solution, and the iron salt finally precipitates, which is a serious defect from the viewpoint of process.

As an improvement technique capable of eliminating this drawback, the group of the present inventors has already developed a technique in which an aqueous phosphoric acid-iron chloride solution is used to decrease the amount of secondarily produced sulfuric acid. However, subsequent researches have elucidated that the concentration of sulfuric acid in the aqueous iron-containing solution increases, while the solution is circularly used for a long time, and so it is necessary to blow down the aqueous iron salt containing solution as a waste solution in a certain ratio and to simultaneously make up the fresh aqueous iron salt containing solution in order to keep the suitable sulfuric acid concentration.

SUMMARY OF THE INVENTION

A first object of the present invention is to provide a process for removal of hydrogen sulfide which can properly treat secondarily produced sulfuric acid to efficiently recover sulfur and hydrogen without forming industrial wastes such as a waste iron salt solution, waste acids and waste iron salts.

A second object of the present invention is to provide a process for removal of hydrogen sulfide by which sulfur and hydrogen can be stably and efficiently recovered for a long time without blowing down industrial wastes even in a long-term continuous operation in a closed system.

The group of the present inventors has intensively researched with the intention of achieving the abovementioned objects. As a result, it has been found that the objects can be accomplished by a technique in which a part of an aqueous iron salt solution containing secondarily produced sulfuric acid is brought into contact with hydrogen to reduce secondarily produced sulfuric acid contained in the solution and to thereby produce hydrogen sulfide, and the thus produced hydrogen sulfide is then returned to a hydrogen sulfide gas absorption apparatus (inclusive of a hydrogen sulfide concentration apparatus on the upstream side of the hydrogen sulfide gas absorption apparatus, if any) to control the sulfuric acid concentration in the system.

Furthermore, it has been found that the solution from which hydrogen sulfide produced by reducing secondarily produced sulfuric acid has been removed can be introduced into a cathode compartment of an electrochemical regeneration apparatus, and the solution at the outlet of the cathode compartment can be returned to the hydrogen sulfide gas absorption apparatus, or the front or the rear of this apparatus (continuously or discontinuously) to prevent the iron ions from accumulating in the cathode solution (transfer from an anode solution), whereby problems such as the replacement of the cathode solution and the blow down of the waste solution can be solved, which permits the continuous operation for a longer time.

The present invention has been completed on the abovementioned knowledge.

That is, the first aspect of the present invention is directed to a process for removal of hydrogen sulfide which comprises the steps of bringing a hydrogen sulfide-containing gas into contact with a sulfuric acid-iron sulfate solution containing ferric ions to absorb hydrogen sulfide and to carry out an oxidation reaction in a hydrogen sulfide gas absorption-oxidation step, whereby a solution containing ferrous ions, sulfur and secondarily produced sulfuric acid (in which excessive ferric ions, previously blended original sulfuric acid and the like coexist sometimes) is produced; introducing a solution at the outlet of the hydrogen sulfide gas absorption-oxidation step into a sulfur separation step to separate sulfur from the solution; introducing a solution at the outlet of the sulfur separation step into an electrochemical regeneration step to generate and recover hydrogen; circulating a solution at the outlet of the electrochemical regeneration step through the hydrogen sulfide gas absorption-oxidation step; introducing a part of the solution at the outlet of the sulfur separation step into a secondarily produced sulfuric acid reduction step (continuously or discontinuously) to bring the solution into contact with hydrogen and to thereby reduce secondarily produced sulfuric acid contained in the solution, thereby producing hydrogen sulfide; returning the thus produced hydrogen sulfide to the hydrogen sulfide gas absorption-oxidation step, or the front (which includes a hydrogen sulfide concentration apparatus on the upstream side) or the rear of this hydrogen sulfide gas absorption-oxidation step; and then returning a solution at the outlet of the secondarily produced sulfuric acid reduction step to the sulfur separation step or the front of this sulfur separation step.

The second aspect of the present invention is directed to a process for removal of hydrogen sulfide which comprises the steps of bringing a hydrogen sulfide-containing gas into contact with a sulfuric acid-iron sulfate solution containing ferric ions to absorb hydrogen sulfide and to carry out an oxidation reaction in a hydrogen sulfide gas absorption-oxidation step, whereby a solution containing ferrous ions, sulfur and secondarily produced sulfuric acid (in which excessive ferric ions, previously blended original sulfuric acid and the like coexist sometimes) is produced; introducing a solution at the outlet of the hydrogen sulfide gas absorption-oxidation step into a sulfur separation step to separate sulfur from the solution; introducing a solution at the outlet of the sulfur separation step into an anode compartment of an electrochemical regeneration apparatus in an electrochemical regeneration step to generate and recover hydrogen in a cathode compartment of this apparatus; circulating a solution at the outlet of the anode compartment of the electrochemical regeneration apparatus through the hydrogen sulfide gas absorption-oxidation step; introducing a part of the solution at the outlet of the sulfur separation step into a secondarily produced sulfuric acid reduction step (continuously or discontinuously) to bring the solution into contact with hydrogen and to thereby reduce secondarily produced sulfuric acid contained in the solution, thereby producing hydrogen sulfide; returning the thus produced hydrogen sulfide to the hydrogen sulfide gas absorption-oxidation step, or the front (which includes a hydrogen sulfide concentration apparatus on the upstream side) or the rear of this hydrogen sulfide gas absorption-oxidation step; introducing all or a part of a solution at the outlet of the secondarily produced sulfuric acid reduction step into the cathode compartment of the electrochemical regeneration apparatus in the electrochemical regeneration step; and then returning the solution at the outlet of the cathode compartment and the solution at the outlet of the secondarily produced sulfuric acid reduction step which has not been introduced into the cathode compartment to the hydrogen sulfide gas absorption-oxidation step, or the front or the rear of this hydrogen sulfide gas absorption-oxidation step (continuously or discontinuously).

1 Hydrogen sulfide gas absorption apparatus, 2 Sulfur separation apparatus, 3 Electrochemical regeneration apparatus, 3-1 Anode compartment, 3-2 Cathode compartment, 4 Hydrogen reduction apparatus, 5 Gas-liquid separator, A Hydrogen sulfide-containing gas, B Sulfur, C Hydrogen gas, D Hydrogen sulfide gas, E Treated gas, F Recovered solution, G Circulating solution.

DESCRIPTION OF PREFERRED EMBODIMENT

A process for removal of hydrogen sulfide of the present invention includes a hydrogen sulfide absorption-oxidation step, a sulfur separation step, an electrochemical regeneration step and a hydrogen reduction step of secondarily produced sulfuric acid as essential steps.

Hydrogen sulfide absorption-oxidation step (gas-liquid contact step)

In this step, a hydrogen sulfide-containing gas is brought into contact with an aqueous sulfuric acid-iron sulfate solution containing ferric ions. The hydrogen sulfide-containing gas which is to be treated in this step may be a pure hydrogen sulfide gas or a mixed gas of hydrogen sulfide and a gas inert to the ferric ions and hydrogen sulfide, such as hydrogen, carbon monoxide, carbon dioxide, a hydrocarbon (methane, ethane or the like) or nitrogen.

On the other hand, as an absorbing solution which is to be brought into contact with the hydrogen sulfide-containing gas, there can be used an aqueous sulfuric acid-iron sulfate solution containing the trivalent iron ions (ferric ions) for oxidizing hydrogen sulfide, but this absorbing solution may contain ferrous salts, other salts and the like, so long as they do not impair the objects of the present invention.

No particular restriction is put on an ion concentration in the aqueous iron salt solution to be used, but the concentration of the ferric ions is in the range of usually from 0.1 to 5.0 mols/liter, preferably from 0.5 to 1.5 mols/liter. If the concentration of the ferric ions is less than 0.1 mol/liter, an absorption ratio (conversion) of hydrogen sulfide declines, and if it is more than 5.0 mols/liter, solubility is unpreferably poor.

Moreover, as ferrous ions which are not essential, ferrous sulfate can be used, and it is usually present in the range of from 0.1 to 3.0 mols/liter, preferably from 0.5 to 1.5 mols/liter. The addition of the ferrous ions intends to mainly improve the efficiency of an electrochemical treatment. However, if the amount of the ferrous ions to be added is less than 0.1 mol/liter, its effect cannot be obtained, and if it is more than 3.0 mols/liter, the iron salts (particularly ferrous sulfate) tend to precipitate unpreferably.

The amount of sulfuric acid is in the range of usually from 0.1 to 5 mols/liter, preferably from 1 to 4 mols/liter. If the amount of sulfuric acid is less than 0.1 mol/liter, the secondary production of sulfuric acid increases, so that the efficiency of electrochemical regeneration declines sometimes. If it is more than 5 mols/liter, the iron salts (particularly ferrous sulfate) tend to precipitate unpreferably.

No particular restriction is put on a procedure for carrying out this hydrogen sulfide absorption-oxidation step, and a technique which has been conventionally used to absorb a gas by a liquid can be used. In the case of such a technique, there can be employed a general-purpose absorption column such as a bubble column, a spray column, a wet wall column, a stirring type absorption column, a packed bubble column or a packed column.

A reaction formula of an oxidation step for producing sulfur from hydrogen sulfide in this step is as follows:

$$2Fe^{3+} + H_2S = 2Fe^{2+} + S \text{ (precipitate)} \tag{I}$$

That is, hydrogen sulfide is oxidized with the ferric ions to produce sulfur, so that the ferric ions are reduced to the ferrous ions. Simultaneously, the reaction in this step secondarily produces sulfuric acid. As a result, the ferrous ions, sulfur and secondarily produced sulfuric acid are contained in the solution. In a certain case, the excessive ferric ions and previously blended original sulfuric acid coexist in this solution.

The temperature in the hydrogen sulfide absorption-oxidation step is usually in the range of from 50° to 155° C., preferably from 120° to 140° C. If this temperature is less than 50° C., an absorption ratio (conversion) of hydrogen sulfide declines, and it is difficult to separate sulfur. Particularly, in order to achieve the quick separation, it is preferred that the temperature is higher than the melting point of sulfur, but since the melting point of sulfur varies with allotropies, it is preferred that the temperature is higher than 120° C. When the temperature is set to the melting point of sulfur or more, sulfur is produced in a melting state, so that it can be easily separated from the aqueous solution by a difference of specific gravity. Thus, if the temperature in the hydrogen sulfide absorption-oxidation step is less than the above-mentioned temperature range, the separation of sulfur is difficult and it is also difficult to recover sulfur in a high purity. On the other hand, if the temperature is above 155° C., the viscosity of molten sulfur increases, which makes handling inconvenient.

Furthermore, no particular restriction is put on the pressure in the reaction, so long as it is within an acceptable range from an operational viewpoint, i.e., so long as the pressure is such as to prevent the boiling of the solution and to maintain the desired temperature. Nevertheless, the pressure is preferably 1.5 atm ($1.51987 \times 10^5$ Pa) or more.

Sulfur separation step

In this step, sulfur is separated from the solution containing the ferrous ions, sulfur and secondarily produced sulfuric acid which are produced in the above-mentioned hydrogen sulfide absorption-oxidation step. The above-mentioned solution is discharged from the outlet of the hydrogen sulfide absorption-oxidation step. No particular restriction is put on a sulfur separation technique, and various physical and chemical techniques can be used. For example, sedimentation separation and centrifugal separation can be used as the physical techniques, and the conversion of sulfur into a sulfur compound can be used as the chemical technique. As a particularly preferable technique, there is a method in which the produced sulfur is melted, and then separated and recovered by liquid-liquid separation, i.e., sedimentation separation by the utilization of a difference of specific gravity.

No particular restriction is put on a sulfur separation apparatus for use in this sulfur separation step, and the apparatus having any structure can be utilized. For example, a usual thickener, a cavity drum, a sedimentation pool or the like can be suitably selected in compliance with the size of drops of melted sulfur to be separated and recovered and a recovery ratio on the basis of design.

Electrochemical regeneration step

In this step, the solution from which sulfur has been separated and recovered in the above-mentioned sulfur separation step (a solution at the outlet of the sulfur separation step) is treated by the use of an electrochemical means such as electrolysis, whereby the ferrous ions ($Fe^{2+}$) largely contained in the solution are converted into the ferric ions ($Fe^{3+}$) in an anode compartment to regenerate a solution (an absorbing solution or a circulating solution) containing a large amount of the trivalent iron ions (ferric ions), and a hydrogen gas is generated in a cathode compartment to recover the hydrogen gas.

The reaction which proceeds in this step can be shown by the following reaction formula:

$$2Fe^{2+} + 2H^+ = 2Fe^{3+} + H_2(gas) \qquad (II)$$

That is, in the anode compartment, the ferrous ions are oxidized to regenerate the ferric ions, and in the cathode compartment hydrogen ions are reduced to hydrogen gas. The thus regenerated solution can be repeatedly used as the absorbing solution (the circulating solution) in the hydrogen sulfide absorption-oxidation step. In this connection, a material of the portion which is brought into contact with the circulating solution is preferably a non-silica material.

As an electrochemical regeneration apparatus for carrying out this electrochemical regeneration step, there can be utilized an electrolytic cell which has been conventionally used in a usual electrolysis.

In the electrolytic cell by which this step is carried out, a diaphragm is provided between the anode compartment and the cathode compartment. These electrodes are made of an acid-resistant material such as graphite or carbon fiber. The above-mentioned diaphragm is preferably made of a cation exchange membrane.

When the electrolytic cell is used to carry out this electrochemical regeneration step, the solution at the outlet of the sulfur separation step is introduced into the anode compartment of the electrolytic cell.

On the other hand, into the cathode compartment is introduced the aqueous solution usually containing hydrogen ions at a predetermined concentration of, for example, from 0.5 to 5 mols/liter, preferably from 1 to 4 mols/liter. If the concentration deviates from this range, electrolytic voltage rises, so that efficiency deteriorates unpreferably. Alternatively, the supply of water may be made to such a degree that the diaphragm present between the anode and the cathode does not become dry, and voltage may be then applied thereto to perform the electrochemical regeneration treatment.

Particularly in the second invention of the present inventions, all or a part of a solution at the outlet of the secondarily produced sulfuric acid reduction step which will be described hereinafter is introduced into the cathode compartment. When the solution at the outlet of the secondarily produced sulfuric acid reduction step is introduced into the cathode compartment, the accumulation of iron ions in the cathode solution caused by the iron ions transfer from the anode solution to the cathode solution can be prevented. Therefore, in the case that a completely closed system is employed, the replacement of the cathode solution and the blow down of the waste solution are unnecessary any more, which permits the continuous operation for a longer time.

The hydrogen ion concentration in the outlet solution which will be introduced into the cathode compartment is suitably in the range of from 0.5 to 5 mols/liter, preferably from 1 to 4 mols/liter, as in the first invention. If the hydrogen ion concentration deviates from this range, cell voltage rises, so that the efficiency deteriorates unpreferably. After the hydrogen gas generated in this cathode compartment has been separated, or without separating the hydrogen gas, the outlet solution in the cathode compartment is returned to the hydrogen sulfide gas absorption-oxidation step, or the front or the rear of this hydrogen sulfide gas absorption-oxidation step. Now, the rear of the hydrogen sulfide gas absorption-oxidation step means a position on the downstream side of the hydrogen sulfide gas absorption-oxidation step and on the upstream side of the sulfur separation apparatus.

When the cation exchange membrane is used as the diaphragm, a porous gas-permeable electrode such as a graphite fiber cloth, preferably the cloth supporting a catalyst of platinum or the like may be directly brought into contact with the diaphragm.

This electrolysis is usually carried out at 25° to 160° C. Therefore, the electrolysis can be carried out even at a preferable temperature level (120°–140° C.) in the hydrogen sulfide absorption-oxidation step without any problem, and such a high-temperature electrolysis leads to economical improvement.

Furthermore, hydrogen generated by the above-mentioned electrochemical treatment can be collected and recovered by a usual manner, if necessary. In the present invention, with the intention of controlling the amount of secondarily produced sulfuric acid in the system, a part of the recovered hydrogen can be used to reduce secondarily produced sulfuric acid contained in the treated solution, thereby producing hydrogen sulfide.

Secondarily produced sulfuric acid reduction step

In this step, a part of the solution at the outlet of the sulfur separation step containing the ferrous ions and secondarily produced sulfuric acid is brought into contact with hydrogen to reduce secondarily produced sulfuric acid contained in the solution and to thereby produce hydrogen sulfide, and this hydrogen sulfide (containing hydrogen) is returned to the hydrogen sulfide gas absorption-oxidation step, or the front or the rear of this hydrogen sulfide gas absorption-oxidation step to control the amount of secondarily produced sulfuric acid in the system.

The reaction formula for reducing secondarily produced sulfuric acid with hydrogen to produce hydrogen sulfide is as follows:

$$H_2SO_4 + 4H_2 = H_2S + 4H_2O \qquad (III)$$

That is, sulfuric acid is reduced with hydrogen to produce hydrogen sulfide.

The reduction reaction of sulfuric acid with hydrogen can be carried out by the utilization of any of various apparatuses which have been used in a usual gas-liquid-solid (a catalyst) system.

For example, in the case that the hydrogen reduction reaction is carried out by the use of a slurry bed type reactor, a particulate catalyst having a small diameter can be used. In this case, the efficiency of the contact with the aqueous sulfuric acid solution can be enhanced, and so the reaction can efficiently proceed. However, in the case that this slurry bed type reactor is used, a liquid-solid separation apparatus is required after the reaction.

Moreover, the hydrogen reduction reaction can be carried out by the use of a gas-liquid parallel current type trickle bed. In this case, a falling flow system is suitable for a large-sized apparatus which can treat in large quantities, whereas a rising flow system is suitable for a small-sized apparatus.

Alternatively, a packed bubble column can be used for the hydrogen reduction reaction.

In the practice of the hydrogen reduction reaction, the amount of the solution at the outlet of the sulfur separation step which is to be fed to the hydrogen reduction apparatus depends upon a balance between a secondary production ratio of sulfuric acid in the hydrogen sulfide absorption-oxidation step and a hydrogen reduction reaction rate in the secondarily produced sulfuric acid reduction step. For example, when the secondary production ratio of sulfuric acid is about 2%, the solution is usually fed in an amount corresponding to 1 to 5% by volume of the solution at the outlet of the sulfur separation step.

Furthermore, as a hydrogen gas which is fed for the hydrogen reduction reaction of secondarily produced sulfuric acid in the fed outlet solution, a hydrogen gas flow generated in the above-mentioned electrochemical regeneration step can be introduced in an amount corresponding to 5 to 35% by volume (an excess amount), or external hydrogen may be introduced in a necessary amount.

In the hydrogen reduction reaction, any of various catalysts can be used. One example of the preferable catalysts is a platinum-supporting active carbon, which permits the reaction to efficiently proceed.

The temperature in this hydrogen reduction reaction is usually in the range of from 100° to 180° C., preferably from 120° to 150° C. If this reaction temperature is less than 100° C., a reaction rate is very low. On the contrary, if it is higher than 180° C., the pressure increases, which is not preferable from the viewpoint of process.

The pressure in the hydrogen reduction reaction is not particularly limited, so long as it is such pressure as to prevent water of the aqueous iron salt solution from vaporizing and to maintain the above-mentioned suitable temperature. In general, the pressure is preferably 3 atm ($3.03975 \times 10^5$ pa) or more.

Hydrogen sulfide produced by the reduction of secondarily produced sulfuric acid with hydrogen in the secondarily produced sulfuric acid reduction step is returned to the above-mentioned hydrogen sulfide gas absorption-oxidation step, or the front (a hydrogen sulfide concentration apparatus on the upstream side, if any) or the rear of this hydrogen sulfide gas absorption-oxidation step.

The reason why hydrogen sulfide (containing excess hydrogen) produced by the hydrogen reduction reaction is returned to the hydrogen sulfide gas absorption-oxidation step is that an absorption-oxidation reaction of the recovered hydrogen sulfide can allowed to sufficiently proceed, as in the case of the absorbing gas (the hydrogen sulfide-containing gas first introduced into the hydrogen sulfide gas absorption-oxidation step).

Furthermore, the reason why hydrogen sulfide is returned to the front of the rear of the hydrogen sulfide gas absorption-oxidation step is that the hydrogen sulfide gas recovered from the secondarily produced sulfuric acid reduction step is required to be returned to a line having a temperature level higher than the melting point of sulfur containing the ferric ions in order to convert the hydrogen sulfide gas into liquid sulfur, and a position to which hydrogen sulfide is to be returned may be any position on the upstream of the sulfur separation step. It can be decided in consideration of the balance of the whole system whether hydrogen sulfide should be returned to the hydrogen sulfide gas absorption-oxidation step, or the front or the rear of this hydrogen sulfide gas absorption-oxidation step.

On the other hand, the recovered solution (a solution at the outlet of the secondarily produced sulfuric acid reduction step) in which secondarily produced sulfuric acid has been reduced is returned to the sulfur separation step or the front of this step, in the case of the first invention. This reason is that a trace amount of dissolved hydrogen sulfide is contained in the outlet solution, and sulfur is produced when the outlet solution is joined to the aqueous iron salt solution containing the ferric ions.

On the contrary, in the case of the second invention, all or a part of the solution at the outlet of the secondarily produced sulfuric acid reduction step is introduced into the cathode compartment of the electrochemical regeneration apparatus in the electrochemical regeneration step. This step is as described above. In the case that a part of the solution at the outlet of the secondarily produced sulfuric acid reduction step is only introduced into the cathode compartment, the remaining outlet solution is returned to the hydrogen sulfide gas absorption-oxidation step, or the front or the rear of this hydrogen sulfide gas absorption-oxidation step.

As described above, the secondarily produced sulfuric acid contained in the solution is reduced with hydrogen to control the content of the sulfuric acid in the system, whereby the continuous treatment is possible, with the whole system closed.

Next, a preferable embodiment of the present invention will be described in reference to FIGS. 1 and 2. Here, FIG. 1 shows an embodiment of the first invention, and FIG. 2 shows an embodiment of the second invention.

Figure 1:
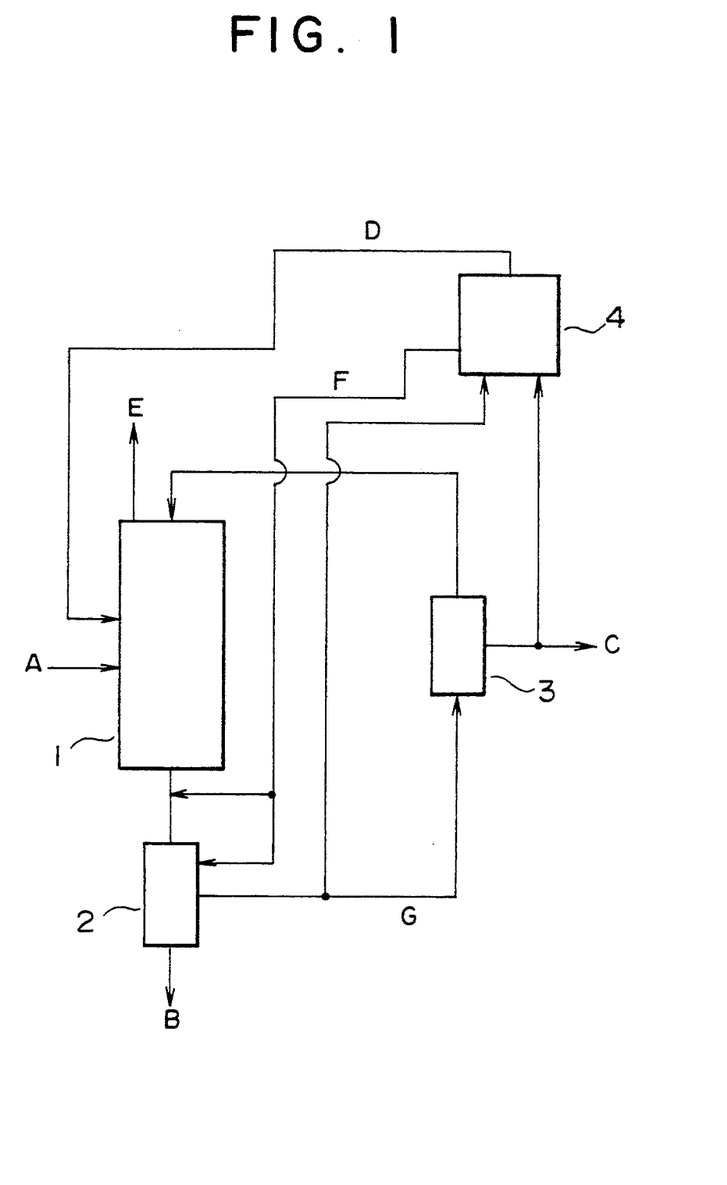
FIG. 1 shows one embodiment of the first invention.
Figure 2:
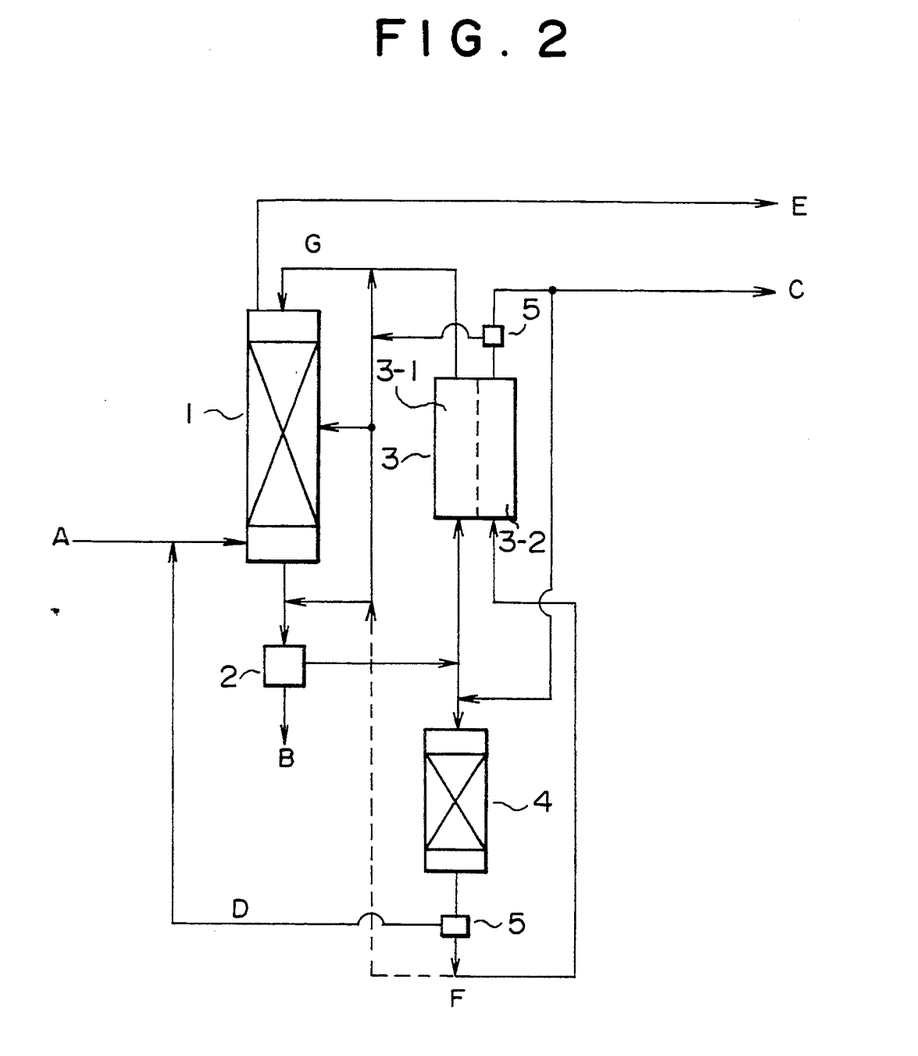
FIG. 2 shows one embodiment of the second invention.

Description of FIG. 1

FIG. 1 is a schematic view illustrating one example of a treatment process regarding the first invention.

As shown in FIG. 1, into a hydrogen sulfide gas absorption apparatus 1 (e.g., an absorption column) are introduced a hydrogen sulfide ($H_2S$)-containing gas A which is a gas to be treated and an aqueous sulfuric acid-iron sulfate solution containing ferric ions. In an early stage of the operation, a freshly prepared solution is introduced into the absorption column, as this aqueous sulfuric acid-iron sulfate solution.

After the operation of the apparatus has been started, it is preferred to feed the aqueous sulfuric acid-iron sulfate solution obtained in an electrochemical regeneration apparatus 3 (e.g., an electrolytic cell), because of being efficient.

The interior of the absorption column is heated by a heater which is not shown. The gas to be treated and the aqueous sulfuric acid-iron sulfate solution are introduced into the absorption column to bring both of them into contact with each other, and at this time, an oxidation reaction proceeds in accordance with the above-mentioned reaction formula (I) to produce sulfur and to simultaneously obtain a solution containing ferrous ions and secondarily produced sulfuric acid. In this case, if the temperature in the reaction system is higher than the melting point of sulfur, sulfur scarcely adheres to the inside wall of the absorption column preferably.

Next, the solution containing the ferrous ions, sulfur and secondarily produced sulfuric acid is forwarded to a sulfur separation apparatus 2. Incidentally, in front of this step, if desired, a step for coalesce of molten sulfur may be provided.

In the sulfur separation apparatus, molten sulfur is settled in the solution owing to a difference of specific gravity, and it is then easily recovered through the bottom of the separation apparatus. When sulfur is separated in the melting state, the internal structure of the sulfur separation apparatus can be simplified.

Then, the solution (a circulating solution) from which sulfur has been recovered is discharged from the sulfur separation apparatus and fed to the electrochemical regeneration apparatus 3 (e.g., the electrolytic cell). In this electrolytic cell, the reaction of the above-mentioned reaction formula (II) proceeds.

As an apparatus which can be used in this electrochemical treatment, there can be used the electrolytic cell of a conventional model, as described above. In this electrolytic cell, a diaphragm is provided between an anode and a cathode, and these electrodes are made of an acid-resistant material such as graphite or carbon fiber. This diaphragm is preferably made of a cation exchange membrane.

If the solution (the circulating solution) containing the ferrous ions and secondarily produced sulfuric acid which will be fed to the electrolytic cell has a high sulfur concentration, electrolysis performance deteriorates inconveniently. Thus, it is preferred that sulfur is removed as much as possible from the solution to be fed to the electrolytic cell.

If desired, a filter can be provided in front of the electrolytic cell.

Then, a part of the solution containing the ferrous ions and secondarily produced sulfuric acid from which sulfur has been separated by the sulfur separation apparatus is fed to a hydrogen reduction apparatus 4.

Into this hydrogen reduction apparatus 4 is simultaneously introduced a part of hydrogen recovered by the electrolysis in the electrochemical regeneration apparatus 3 or external hydrogen in order to reduce secondarily produced sulfuric acid with hydrogen. In this hydrogen reduction apparatus, the reaction of the above-mentioned reaction formula (III) proceeds to reduce secondarily produced sulfuric acid with hydrogen, thereby producing hydrogen sulfide.

The thus produced hydrogen sulfide (including hydrogen) is returned to the hydrogen sulfide gas absorption apparatus 1, or the front or the rear of this hydrogen sulfide gas absorption apparatus 1 which is not shown in the drawings.

Description of FIG. 2

FIG. 2 is a schematic view illustrating one example of a treatment process regarding the second invention.

As shown in FIG. 2, into a hydrogen sulfide gas absorption apparatus 1 (e.g., an absorption column) are introduced a hydrogen sulfide-containing gas A which is a gas to be treated and an aqueous sulfuric acid-iron sulfate solution containing ferric ions. In an early stage of the operation, a freshly prepared solution is introduced into the gas absorption column, as this aqueous sulfuric acid-iron sulfate solution.

After the operation of the apparatus has been started, it is preferred to feed the aqueous sulfuric acid-iron sulfate solution (a circulating solution) obtained in an electrochemical regeneration apparatus 3 (e.g., an electrolytic cell), because of being efficient.

The interior of the absorption column is heated by a heater which is not shown. The gas to be treated and the aqueous sulfuric acid-iron sulfate solution are introduced into the absorption column to bring both of them into contact with each other, and at this time, an oxidation reaction proceeds in accordance with the above-mentioned reaction formula (I) to produce sulfur and to simultaneously obtain a solution containing ferrous ions and secondarily produced sulfuric acid. In this case, if the temperature in the reaction system is higher than the melting point of sulfur, sulfur scarcely adheres to the inside wall of the absorption column preferably.

Next, the solution containing the ferrous ions, sulfur and secondarily produced sulfuric acid is forwarded to a sulfur separation apparatus 2. Incidentally, in front of this step, if desired, a step for coalesce of molten sulfur may be provided.

In the sulfur separation apparatus, molten sulfur is settled in the solution owing to a difference of specific gravity, and it is then easily recovered through the bottom of the separation apparatus. When sulfur is separated in the melting state, the internal structure of the sulfur separation apparatus can be simplified.

Then, the solution from which sulfur has been recovered is discharged from the sulfur separation apparatus and fed to an anode compartment 3-1 of the electrochemical regeneration apparatus 3 (e.g., the electrolytic cell). In this anode compartment, the reaction of the above-mentioned reaction formula (II) proceeds.

As an apparatus which can be used in this electrochemical regeneration, there can be used the electrolytic cell of a conventional model, as described above. In this electrolytic cell, a diaphragm is provided between an anode and a cathode, and these electrodes are made of an acid-resistant material such as graphite or carbon fiber. This diaphragm is preferably made of a cation exchange membrane.

If the solution containing the ferrous ions and secondarily produced sulfuric acid which will be fed to the electrolytic cell has a high sulfur concentration, electrolysis performance deteriorates inconveniently. Thus, it is preferred that sulfur is removed as much as possible from the solution to be fed to the electrolytic cell.

If desired, a filter can be provided in front of the electrolytic cell.

The solution regenerated in the anode compartment is forwarded as the hydrogen sulfide absorbing solution (the circulating solution) to the hydrogen sulfide gas absorption apparatus 1.

Then, a part of the solution containing the ferrous ions and secondarily produced sulfuric acid from which sulfur has been separated by the sulfur separation apparatus 2 is fed to a hydrogen reduction apparatus 4.

Into this hydrogen reduction apparatus 4 is simultaneously introduced a part of hydrogen recovered by the electrolysis in the electrochemical regeneration apparatus 3 or external hydrogen in order to reduce secondarily produced sulfuric acid with hydrogen. In this hydrogen reduction apparatus, the reaction of the above-mentioned reaction formula (III) proceeds to reduce secondarily produced sulfuric acid with hydrogen, thereby producing hydrogen sulfide.

The thus produced hydrogen sulfide (including hydrogen) is returned to the hydrogen sulfide gas absorption apparatus 1, or the front or the rear of this hydrogen sulfide gas absorption apparatus 1 which is not shown in the drawings.

On the other hand, if desired, a part of the recovered solution in which secondarily produced sulfuric acid has been reduced is returned to the hydrogen sulfide gas absorption apparatus 1, or the front or the rear of this hydrogen sulfide gas absorption apparatus 1, and the remaining solution is forwarded to the cathode compartment 3-2 of the electrochemical regeneration apparatus 3. After a generated hydrogen gas in the cathode compartment has been separated, the cathode solution is then returned to the hydrogen sulfide gas absorption apparatus 1, or the front or the rear of this hydrogen sulfide gas absorption apparatus 1.

In FIG. 2, reference numeral 5 is a gas-liquid separator.

According to a treatment process of the present invention for recovering sulfur and hydrogen from a hydrogen sulfide-containing gas by a combination of an aqueous iron salt solution treatment and an electrochemical recovery treatment, secondarily produced sulfuric acid can be effectively removed from an aqueous iron salt solution, and a long-term continuous operation is possible in a closed system in which any industrial wastes are not discharged, whereby sulfur and hydrogen can be efficiently recovered.

In particular, according to the second process of the present invention, secondarily produced sulfuric acid can be effectively removed from the aqueous iron salt solution, and iron ions can be prevented from accumulating in a cathode solution, whereby sulfur and hydrogen can be efficiently recovered in a more complete closed system.

Furthermore, according to the present invention, an electrochemical recovery treatment (a high-temperature electrolysis) can be carried out at a similar temperature level of a hydrogen sulfide absorption-oxidation step without any problem, whereby a cooling operation of a hydrogen sulfide-absorbing solution can be omitted, and so a process can be simplified and economical improvement can be accomplished.

Next, the present invention will be described in more detail in reference to examples, but the scope of the present invention should not be limited to these examples. In this connection, Examples 1 to 4 are concerned with the first invention, and Examples 5 and 6 are concerned with the second invention.

EXAMPLE 1

A hydrogen sulfide-absorbing solution containing ferric ions (composition at the inlet of an absorption column: $FeSO_4$ =0.70 mol/liter, $Fe(SO_4)_{1.5}$ =0.50 mol/liter and $H_2SO_4$ =3.0 mols/liter) was circulated through the absorption column at 30 liters/hour.

Then, hydrogen sulfide was fed to the absorption column at 3.7 mols/hour to carry out reaction. In this case, reaction temperature was 130° C. and reaction pressure was 4.5 atm ($4.55963 \times 10^5$ Pa).

Next, the absorbing solution discharged from the absorption column was introduced into a sulfur separation apparatus, and in this apparatus, produced sulfur was separated and removed therefrom. Afterward, the solution was introduced into an anode compartment of an electrolytic cell (an electrode area =2,000 $cm^2$, the anode: a carbon plate-a carbon fiber cloth, a diaphragm: a commercial cation exchange membrane, a cathode: a carbon fiber cloth with a platinum catalyst-a carbon plate) as an anolyte. Moreover, an electrolyte containing $H_2SO_4$ at 3.0 mols/liter was circulated as a catholyte through the cathode compartment at 30 liters/hour. Electrolysis temperature was 50° C., and a constant current operation was carried out at a current density of 100 $mA/cm^2$.

After 500 hours, 10 liters of the electrolyte in the anode compartment was drawn and then analyzed. As a result, the concentration of $H_2SO_4$ was 3.05 mols/liter.

In order to reduce sulfuric acid in this electrolyte with hydrogen, the following experiment was carried out.

The hydrogen reduction treatment of the electrolyte was performed by a semi-batch method using a slurry bed.

A reactor (lined with Teflon ®) had a capacity of 150 ml and is equipped with a hydrogen gas blowing pipe, a gas outlet and a thermometer, and this reactor was put on a hot plate with an electromagnetic stirrer.

In the reactor were placed 100 ml of the electrolyte and 1 g of a catalyst [Pt (3% by weight)-active carbon, average particle diameter: 0.1 mm], and it was then sealed, followed by replacement with nitrogen gas.

The electrolyte was heated up to a predetermined temperature under 4.5 atmG ($5.57287 \times 10^5$ Pa). A hydrogen gas was introduced into the reactor at a constant flow rate (0.07 mol/hour) under constant stirring conditions (450 rpm).

A gas discharged from the reactor was collected in a TEDLAR ® bag (in an early stage of the reaction, the hydrogen gas was consumed for the reduction of the ferric ions, and therefore less hydrogen sulfide was generated).

Concentrations of hydrogen sulfide in the collected gas were measured, and the amount of generated hydrogen sulfide per hour was calculated in accordance with the equation $$y = 0.07x/(1+3x)$$

[wherein y was the amount of generated hydrogen sulfide per hour (mol/hour); x was the concentration of hydrogen sulfide (mol%); and in this case, the hydrogen gas was constantly introduced at 0.07 mol/hour].

A relation between the reaction temperature and the generation rate of hydrogen sulfide was as shown in Table 1.

TABLE 1

| Reaction Temp. (°C.) | Generation Rate of Hydrogen Sulfide (mol/g · cat., hour) |
| --- | --- |
| 130 | $0.46 \times 10^{-3}$ |
| 140 | $0.98 \times 10^{-3}$ |

Moreover, the amount of generated hydrogen sulfide was substantially coincident with the amount of decreased sulfuric acid.

EXAMPLE 2

The same procedure as in Example 1 was carried out under the following reaction conditions, and a relation between the concentration of sulfuric acid and the generation rate of hydrogen sulfide was evaluated.

| Reaction Conditions | |
| --- | --- |
| Aqueous sulfuric acid-iron sulfate solution | 100 ml |
| Catalyst   Pt (3 wt %)-active carbon | |
| Average particle diameter = | 0.1 mm |
| Amount = | 1 g |
| Reaction temp. | 140° C. |
| Reaction pressure | 4.5 atmG (5.57287 × $10^5$ Pa) |
| Hydrogen gas | 0.07 mol/hour |

The measured results are shown in Table 2.

TABLE 2

| Conc. of Sulfuric Acid (mols/liter) | Generation Rate of Hydrogen Sulfide (mol/g · cat., hour) |
| --- | --- |
| 4.35 | $4.4 \times 10^{-3}$ |
| 4.0 | $1.9 \times 10^{-3}$ |
| 3.35 | $0.98 \times 10^{-3}$ |
| 2.0 | $0.18 \times 10^{-3}$ |
| 1.25 | $0.04 \times 10^{-3}$ |

EXAMPLE 3

The same procedure as in Example 1 was carried out under the following reaction conditions, and a relation between reaction temperatures and the generation rate of hydrogen sulfide was measured.

| Reaction Conditions | |
| --- | --- |
| Aqueous sulfuric acid-iron sulfate solution | 100 ml |
| Catalyst   Pt (3 wt %)-active carbon | |
| Average particle diameter = | 0.1 mm |
| Amount = | 1 g |
| Conc. of sulfuric acid | 4 mols/liter |
| Reaction pressure | 4.5 atmG (5.57287 × $10^5$ Pa) |
| Hydrogen gas | 0.07 mol/hour |

The measured results are shown in Table 3.

TABLE 3

| Reaction Temp. (°C.) | Generation Rate of Hydrogen Sulfide (mol/g · cat., hour) |
| --- | --- |
| 140 | $1.93 \times 10^{-3}$ |
| 130 | $0.61 \times 10^{-3}$ |
| 120 | $0.35 \times 10^{-3}$ |

EXAMPLE 4

The same procedure as in Example 1 was carried out under the following reaction conditions, and a relation between partial pressures of hydrogen and the generation rate of hydrogen sulfide was measured.

| Reaction Conditions | |
| --- | --- |
| Aqueous sulfuric acid-iron sulfate solution | 100 ml |
| Catalyst   Pt (3 wt %)-active carbon | |
| Average particle diameter = | 0.1 mm |
| Amount = | 1 g |
| Conc. of sulfuric acid | 4 mols/liter |
| Reaction temperatures | 130° C., 140° C. |
| Hydrogen gas | 0.07 mol/hour |

The measured results are shown in Table 4.

TABLE 4

| Reaction Temp. (°C.) | Total Pressure (atm) [Pa] | Partial Pressure of Hydrogen (atm) [Pa] | Generation Rate of Hydrogen Sulfide (mol/g · cat., hour) |
| --- | --- | --- | --- |
| 130 | 8 [$8.106 \times 10^5$] | 6.26 [$6.34294 \times 10^5$] | $0.97 \times 10^{-3}$ |
| 130 | 6.5 [$6.58612 \times 10^5$] | 4.76 [$4.82307 \times 10^5$] | $0.74 \times 10^{-3}$ |
| 130 | 5.5 [$5.57278 \times 10^5$] | 3.76 [$3.80982 \times 10^5$] | $0.61 \times 10^{-3}$ |
| 140 | 8 [$8.106 \times 10^5$] | 5.61 [$5.68433 \times 10^5$] | $3.36 \times 10^{-3}$ |
| 140 | 5.5 [$5.57278 \times 10^5$] | 3.11 [$3.15120 \times 10^5$] | $1.93 \times 10^{-3}$ |
| 140 | 5.5 [$5.57278 \times 10^5$] | 1.07* [$1.08417 \times 10^5$] | $0.4 \times 10^{-3}$ |

*It was diluted to 50% with a nitrogen gas.

The results of Examples 1 to 4 indicate that the hydrogen reduction reaction of secondarily produced sulfuric acid sufficiently proceeded even under various different conditions.

EXAMPLE 5

A hydrogen sulfide-absorbing solution containing ferric ions (composition at the inlet of an absorption column: $FeSO_4$ = 0.70 mol/liter, $Fe(SO_4)_{1.5}$ = 0.50 mol/liter and $H_2SO_4$ = 2.5 mols/liter) was circulated through the absorption column at 30 liters/hour.

Then, hydrogen sulfide was fed to the absorption column at 3.7 mols/hour to carry out reaction. In this case, reaction temperature was 130° C. and reaction pressure was 4.5 atm (4.55963×10⁵ Pa).

Next, the absorbing solution discharged from the absorption column was introduced into a sulfur separation apparatus, and in this apparatus, produced sulfur was separated and removed therefrom. Afterward, the solution was introduced into an anode compartment of an electrolytic cell (an electrode area =2,000 cm², the anode: a carbon plate-a carbon fiber cloth, a diaphragm: a commercial cation exchange membrane (NEOSEP-TA ® CM-1, made by Tokuyama Soda Co., Ltd.), a cathode: a carbon fiber cloth with a platinum catalyst-a carbon plate) as an anolyte. Moreover, an electrolyte containing $H_2SO_4$ at 2.5 mols/liter was circulated as a catholyte through a cathode compartment at 30 liters/hour Electrolysis temperature was 50° C. and a constant current operation was carried out at a current density of 100 mA/cm². At this time, the cell voltage was 0.93 V.

After 500 hours, 10 liters of the electrolyte in the anode compartment was drawn and then analyzed. As a result, the concentration of $H_2SO_4$ was 2.78 mols/liter.

In order to reduce sulfuric acid in this electrolyte with hydrogen, the following experiment was carried out.

The hydrogen reduction treatment of the electrolyte was continuously performed by the use of a fixed-bed flow type reaction apparatus. A reactor had a capacity of 0.5 liter and had a tubular structure with a heating jacket using a heat transfer medium. This reactor was filled with 205 g of an active carbon catalyst supporting 1 wt % of platinum.

After pressure was increased up to 6.0 atmG (7.0927×10⁵ Pa) by introducing hydrogen, the above-mentioned electrolyte was fed at 0.6 liter/hr, and hydrogen was also fed at 30 liters (NTP)/hour. Reaction was continued at a predetermined temperature for about 4 hours. A gas coming from the outlet of the reactor was sampled to measure concentrations of hydrogen sulfide, and the amount of generated hydrogen sulfide per hour and per amount of the catalyst was then calculated.

A relation between the reaction temperature and the generation rate of hydrogen sulfide (a sulfuric acid reduction rate) was as shown in Table 5.

TABLE 5

| Reaction Temp. (°C.) | Generation Rate of Hydrogen Sulfide (mol/g · cat., hour) |
| --- | --- |
| 130 | $0.16 \times 10^{-3}$ |
| 135 | $0.23 \times 10^{-3}$ |
| 140 | $0.34 \times 10^{-3}$ |
| 145 | $0.49 \times 10^{-3}$ |

In addition, from the continuous operation for 200 hours, it was also apparent that the activity of the catalyst did not deteriorate.

Next, sulfuric acid was replaced with a treated solution recovered from the sulfuric acid reduction apparatus ($FeSO_4$ =1.2 mols/liter, $H_2SO_4$ =2.7 mols/liter) as the catholyte, and in this case, it was apparent that electrolysis performance was comparable to that of a case where sulfuric acid was used as a catholyte.

EXAMPLE 6

An electrochemical regeneration treatment was carried out at a similar temperature level (125° C.) of the hydrogen sulfide absorption-oxidation step in order to inspect electrolysis performance in this case. That is, the same hydrogen sulfide-absorbing (circulating) solution as in Example 1 (composition at the time when introduced into an absorption column: $FeSO_4$ =0.70 mol/liter, $Fe(SO_4)_{1.5}$ =0.50 mol/liter and $H_2SO_4$ =2.5 mols/liter) was used, and this circulating solution from which sulfur had been separated and removed was introduced into an anode compartment of an electrolytic cell [an electrode area =70 cm², the anode: a carbon plate-a carbon fiber cloth, a diaphragm: a commercial fluorine-based cation exchange film (Nafion ® 117, made by Du Pont), a cathode: a carbon fiber cloth with a platinum catalyst-a carbon plate] as an anolyte. Moreover, an electrolyte containing $H_2SO_4$ at 2.5 mols/liter was circulated as a catholyte through a cathode compartment at 6 liters/hour. Electrolysis temperature and reaction pressure were set to 125° C. and 4.5 atm (4.55963×10⁵ Pa), respectively, and a constant current density operation was carried out at a current density of 300 mA/cm².

As a result, electrolytic voltage was 0.94 V.

What is claimed is:

1. A process for removal of hydrogen sulfide which comprises the steps of bringing a hydrogen sulfide-containing gas into contact with a sulfuric acid-iron sulfate solution containing ferric ions to absorb hydrogen sulfide and to carry out an oxidation reaction in a hydrogen sulfide gas absorption-oxidation step, whereby a solution containing ferrous ions, sulfur and secondarily produced sulfuric acid is produced; introducing a solution at the outlet of the hydrogen sulfide gas absorption-oxidation step into a sulfur separation step to separate sulfur from the solution; introducing a solution at the outlet of the sulfur separation step into an electrochemical-regeneration step to generate and recover hydrogen; circulating a solution at the outlet of the electrochemical regeneration step through the hydrogen sulfide gas absorption-oxidation step; introducing a part of the solution at the outlet of the sulfur separation step into a secondarily produced sulfuric acid reduction step to bring the solution into contact with hydrogen and to thereby reduce secondarily produced sulfuric acid contained in the solution, thereby producing hydrogen sulfide; returning the thus produced hydrogen sulfide to the hydrogen sulfide gas absorption-oxidation step, or the front or the rear of this hydrogen sulfide gas absorption-oxidation step; and then returning a solution at the outlet of the secondarily produced sulfuric acid reduction step to the sulfur separation step or the front of this sulfur separation step.

2. The process for removal of hydrogen sulfide according to claim 1 wherein, in the secondarily produced sulfuric acid reduction step, a platinum-supporting active carbon is used as a catalyst, and the reduction of secondarily produced sulfuric acid with hydrogen is carried out at 120° to 150° C.

3. The process for removal of hydrogen sulfide according to claim 1 wherein concentrations of ions in the sulfuric acid-iron sulfate solution are 0.1–5 mols/liter of ferric ions, 0.1–3 mols/liter of ferrous ions, and 0.1–5 mols/liter of sulfuric acid.

4. The process for removal of hydrogen sulfide according to claim 1 wherein the reaction temperature in the hydrogen sulfide gas absorption-oxidation step is in the range of from 50° to 155° C.

5. The process for removal of hydrogen sulfide according to claim 1 wherein the reaction pressure in the hydrogen sulfide gas absorption-oxidation step is 1.5 atm (1.51987×10⁵ Pa) or more.

6. The process for removal of hydrogen sulfide according to claim 1 wherein, in the sulfur separation step, produced sulfur is melted, settled and then separated by a difference of specific gravity.

7. The process for removal of hydrogen sulfide according to claim 1 wherein, in the electrochemical regeneration step, the electrochemical regeneration apparatus separated into the anode compartment and the cathode compartment is used.

8. The process for removal of hydrogen sulfide according to claim 7 wherein a part of the solution at the outlet of the sulfur separation step is introduced into the anode compartment, and the aqueous solution containing hydrogen ions is introduced into the cathode compartment.

9. The process for removal of hydrogen sulfide according to claim 8 wherein the concentration of the hydrogen ions in the aqueous solution containing the hydrogen ions is in the range of from 0.5 to 5 mols/liter.

10. The process for removal of hydrogen sulfide according to claim 1 wherein the electrolysis temperature in the electrochemical regeneration step is in the range of from 25° to 160° C.

11. The process for removal of hydrogen sulfide according to claim 1 wherein, in the secondarily produced sulfuric acid reduction step, the hydrogen reduction reaction is carried out by the use of an apparatus selected from the group consisting of a slurry bed type reactor, a gas-liquid parallel current type trickle bed of a falling flow system, a gas-liquid parallel current type flow system, and a packed bubble column.

12. The process for removal of hydrogen sulfide according to claim 1 wherein, in the secondarily produced sulfuric acid reduction step, the hydrogen reduction reaction is carried out by the use of hydrogen generated from the electrochemical regeneration apparatus.

13. A process for removal of hydrogen sulfide which comprises the steps of bringing a hydrogen sulfide-containing gas into contact with a sulfuric acid-iron sulfate solution containing ferric ions to absorb hydrogen sulfide and to carry out an oxidation reaction in a hydrogen sulfide gas absorption-oxidation step, whereby a solution containing ferrous ions, sulfur and secondarily produced sulfuric acid is produced; introducing a solution at the outlet of the hydrogen sulfide gas absorption-oxidation step into a sulfur separation step to separate sulfur from the solution; introducing a solution at the outlet of the sulfur separation step into an anode compartment of an electrochemical regeneration apparatus in an electrochemical regeneration step to generate and recover hydrogen in a cathode compartment of this apparatus; circulating a solution at the outlet of the anode compartment of the electrochemical regeneration apparatus through the hydrogen sulfide gas absorption-oxidation step; introducing a part of the solution at the outlet of the sulfur separation step into a secondarily produced sulfuric acid reduction step to bring the solution into contact with hydrogen and to thereby reduce secondarily produced sulfuric acid contained in the solution, thereby producing hydrogen sulfide; returning the thus produced hydrogen sulfide to the hydrogen sulfide gas absorption-oxidation step, or the front or the rear of this hydrogen sulfide gas absorption-oxidation step; introducing all or a part of a solution at the outlet of the secondarily produced sulfuric acid reduction step into the cathode compartment of the electrochemical regeneration apparatus in the electrochemical regeneration step; and then returning the solution at the outlet of the cathode compartment and the solution at the outlet of the secondarily produced sulfuric acid reduction step which has not been introduced into the cathode compartment to the hydrogen sulfide gas absorption-oxidation step, or the front or the rear of this hydrogen sulfide gas absorption-oxidation step.

14. The process for removal of hydrogen sulfide according to claims 13 wherein, in the secondarily produced sulfuric acid reduction step, a platinum-supporting active carbon is used as a catalyst, and the reduction of secondarily produced sulfuric acid with hydrogen is carried out at 120° to 150° C.

15. The process for removal of hydrogen sulfide according to claim 13 wherein concentrations of ions in the sulfuric acid-iron sulfate solution are 0.1–5 mols/liter of ferric ions, 0.1–3 mols/liter of ferrous ions, and 0.1–5 mols/liter of sulfuric acid.

16. The process for removal of hydrogen sulfide according to claim 13 wherein the reaction temperature in the hydrogen sulfide gas absorption-oxidation step is in the range of from 50° to 155° C.

17. The process for removal of hydrogen sulfide according to claim 13 wherein the reaction pressure in the hydrogen sulfide gas absorption-oxidation step is 1.5 atm (1.51987×10⁵ Pa) or more.

18. The process for removal of hydrogen sulfide according to claim 13 wherein, in the sulfur separation step, produced sulfur is melted, settled and then separated by a difference of specific gravity.

19. The process for removal of hydrogen sulfide according to claim 13 wherein, in the solution at the outlet of the secondarily produced sulfuric acid reduction step which is to be introduced into the cathode compartment of the electrochemical regeneration apparatus, the concentration of the hydrogen ions is in the range of from 0.5 to 5 mols/liter.

20. The process for removal of hydrogen sulfide according to claim 13 wherein the electrolysis temperature in the electrochemical regeneration step is in the range of from 25° to 160° C.

21. The process for removal of hydrogen sulfide according to claim 13 wherein, in the secondarily produced sulfuric acid reduction step, the hydrogen reduction reaction is carried out by the use of an apparatus selected from the group consisting of a slurry bed type reactor, a gas-liquid parallel current type trickle bed of a falling flow system, a gas-liquid parallel current type flow system, and a packed bubble column.

22. The process for removal of hydrogen sulfide according to claim 13 wherein, in the secondarily produced sulfuric acid reduction step, the hydrogen reduction reaction is carried out by the use of hydrogen generated from the electrochemical regeneration apparatus.

* * * * *